US008929269B2

(12) United States Patent
Lee (10) Patent No.: US 8,929,269 B2
(45) Date of Patent: Jan. 6, 2015

(54) APPARATUS AND METHOD FOR CONFIGURING DYNAMIC MBS ZONE FOR MACRO-DIVERSITY GAIN IN CELLULAR SYSTEM

(75) Inventor: Yong-Su Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 69 days.

(21) Appl. No.: 13/537,313

(22) Filed: Jun. 29, 2012

(65) Prior Publication Data

US 2013/0188548 A1   Jul. 25, 2013

(30) Foreign Application Priority Data

Jan. 20, 2012   (KR) ........................ 10-2012-0006972

(51) Int. Cl.
  *H04H 20/71*  (2008.01)
  *H04B 7/00*   (2006.01)
  *H04W 4/00*   (2009.01)

(52) U.S. Cl.
  USPC ............................ 370/312; 370/310; 370/328

(58) Field of Classification Search
  None
  See application file for complete search history.

(56) References Cited

U.S. PATENT DOCUMENTS

| 2007/0072621 | A1* | 3/2007 | Mukkavilli et al. ........ 455/456.1 |
| 2007/0191015 | A1* | 8/2007 | Hwang et al. ................ 455/442 |
| 2009/0323634 | A1* | 12/2009 | Kim et al. ..................... 370/331 |
| 2011/0134822 | A1* | 6/2011 | Lee .............................. 370/312 |
| 2011/0134876 | A1* | 6/2011 | Takada et al. ................ 370/329 |
| 2011/0228798 | A1* | 9/2011 | Oh et al. ...................... 370/468 |

FOREIGN PATENT DOCUMENTS

KR   20110065284 A   6/2011

OTHER PUBLICATIONS

NEC Group; "Potential gain of DL CoMP with joint transmission", 3GPP TSG RAN WG1 Meeting #57, San Francisco, USA, May 4-8, 2009; R1-091688; 5 pages.

* cited by examiner

*Primary Examiner* — Ayaz Sheikh
*Assistant Examiner* — Mariela Vidal Carpio
(74) *Attorney, Agent, or Firm* — Ladas & Parry LLP (57) ABSTRACT

A method of configuring a multicast/broadcast service (MBS) zone in a base station is provided. The method includes determining whether terminals connected for communication are positioned in a boundary area of a cell by calculating positions of the terminals, and deciding an MBS zone of the terminals positioned in the boundary area of the cell.

8 Claims, 9 Drawing Sheets

APPARATUS AND METHOD FOR CONFIGURING DYNAMIC MBS ZONE FOR MACRO-DIVERSITY GAIN IN CELLULAR SYSTEM

CROSS-REFERENCE TO RELATED APPLICATION

This application claims the benefit under 35 U.S.C. §119(a) of Korean Patent Application No. 10-2012-0006972, filed on Jan. 20, 2012, the entire disclosure of which is incorporated herein by reference for all purposes.

BACKGROUND

1. Field

The following description relates to a cellular system, and more particularly, to an apparatus and method for dynamically configuring a multicast/broadcast service (hereinafter, referred to as "MBS") zone using neighboring base stations positioned near terminals positioned in a boundary area of a cell.

2. Description of the Related Art

In general, a wireless communication system provides the Internet, Voice over IP (VoIP), non real-time streaming service, Mobile-WiMAX or WiBro, and multicast/broadcast service (MBS) as major services.

Among the services provided by the wireless communication system, the MBS has recently been attracting attention as a new service. The MBS is next generation mobile television (TV) technology which can receive broadcasting using a wideband code division multiple access (WCDMA) (asynchronous third generation mobile communication) communication network. This is unlike other mobile TV technologies such as digital multimedia broadcasting (DMB), digital video broadcast-handheld (DVB-H), and the like which separately require broadcast frequencies in addition to communication frequencies. And, the MBS provides video services such as news, drama, and sports, and data service such as radio music broadcasting and real-time traffic information.

Also, the MBS can concurrently transmit various channels of high-quality video and audio with high data rates using a macro diversity technique.

However, in the conventional MBS, the MBS zone is set by an MBS management device. For this, the MBS management device receives position information of a terminal positioned in a cell managed by a base station within a first tier MBS zone from the base station, determines whether the terminal is positioned in a boundary area of the cell, and sets an MBS zone of the terminal to include a base station of the neighboring cell in the boundary area of the cell when the terminal is positioned in the boundary area of the cell.

Specifically, the base station periodically transmits, to the MBS management device, position information of all terminals which are currently positioned in the cell. In this instance, the base station also transmits position information of terminals which are not positioned in the boundary area of the cell to the MBS management device, but the position information of the terminals which are not positioned in the boundary area of the cell is unnecessary information.

Accordingly, resources are wasted in transmitting unnecessary information to the MBS management device.

Also, interference signals from a neighboring cell as well as position information of a corresponding terminal are not taken into account, so that a method of determining the closest base station to the terminal positioned in the boundary area of the cell to thereby configure the MBS zone is not clear.

SUMMARY

The following description relates to an apparatus and method for setting a multicast/broadcast service (hereinafter, referred to as "MBS") zone in a base station which prevent transmission of unnecessary information.

The following description relates to an apparatus and method for setting an MSB zone based on a Carrier to Interference and Noise Ratio (hereinafter, referred to as "CINR") of terminals positioned in a boundary area of a cell.

In one general aspect, there is provided a method for configuring an MBS zone of a terminal in a base station, including: determining whether terminals connected for communication are positioned in a boundary area of a cell by calculating positions of the terminals; and deciding an MBS zone of the terminals positioned in the boundary area of the cell.

In another general aspect, there is provided a base station configuring an MBS zone, including: a terminal position detection unit that determines whether terminals connected for communication are positioned in a boundary area of a cell by calculating positions of the terminals; and an MBS zone setting unit that decides an MBS zone of the terminals positioned in the boundary area of the cell.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, preferred embodiments of the present invention will be described in detail with reference to accompanying drawings.

Figure 1:
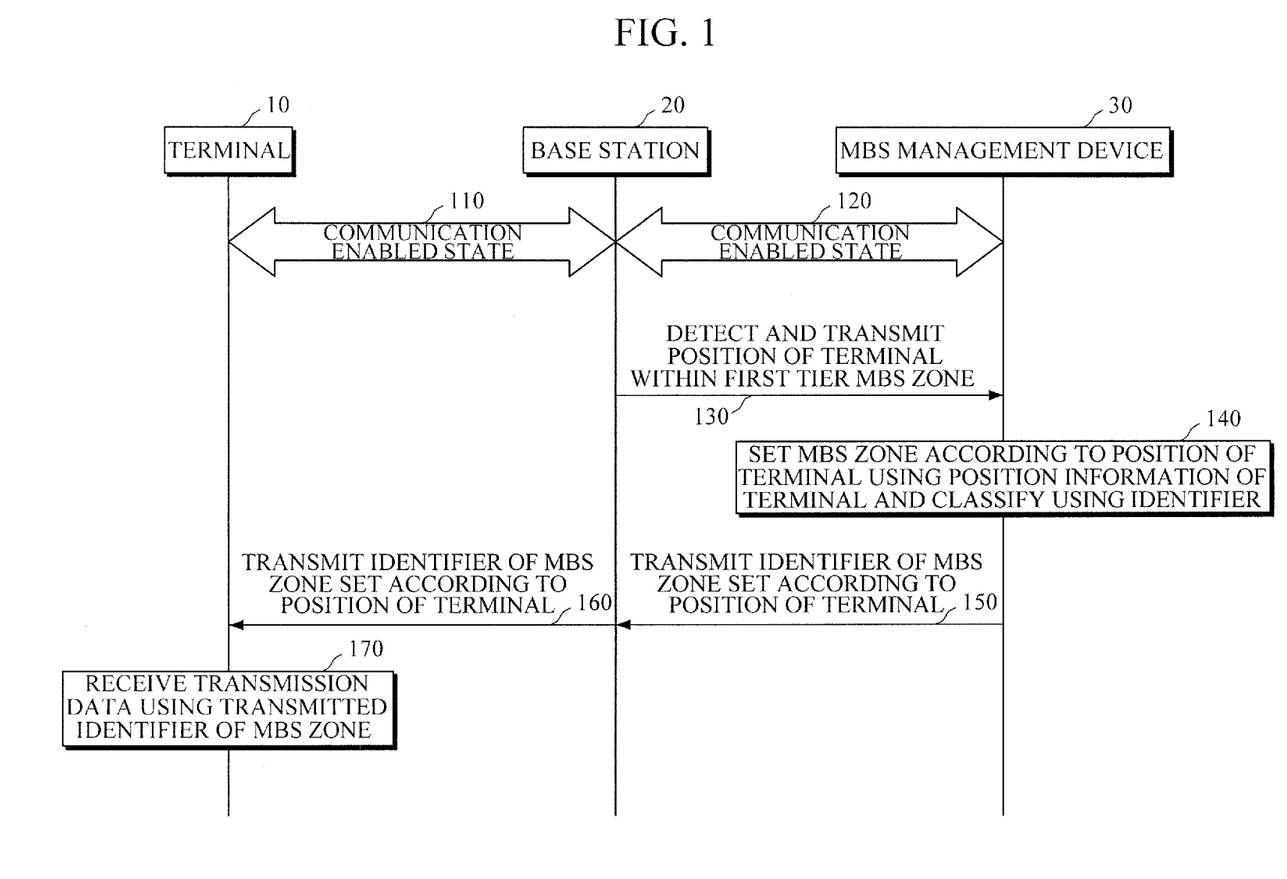
FIG. 1 is a diagram illustrating a general method of configuring a multicast/broadcast service (MBS) zone.

FIG. 1 is a diagram illustrating a general method of configuring a multicast/broadcast service (hereinafter, referred to as "MBS") zone.

In operation 110, a terminal 10 according to an embodiment of the present invention establishes a basic communication channel with a base station for setting an MBS zone.

In operation 120, the base station 20 establishes a basic communication channel with an MBS management device 30 for setting an MBS zone.

First, the base station 20 periodically detects position information of the terminal 10 communicating with a cell where the base station 20 is positioned within a first tier MBS zone, or detects the position information of the terminal 10 when a request is received from an MBS management device 30.

In operation 130, the base station 20 transmits the detected position information of the terminal 10 to the MBS management device 30.

In operation 140, the MBS management unit 30 receives the position information of the terminal 10 from the base station 20 and sets the MBS zone in accordance with a result obtained by determining whether the terminal 10 is positioned in a boundary area of the cell using the position information of the terminal 10. That is, when the terminal 10 is positioned in the boundary area of the cell, the MBS zone is set to include a base station positioned in the closest neighboring cell to the boundary area of the cell, and the set MBS zone is classified using an identifier.

In operation 150, the MBS management device 30 transmits the identifier of the set MBS zone to the base station 20 in accordance with the position of the terminal 10.

In operation 160, the base station 20 transmits, to the terminal 10, the identifier of the MBS zone to include the identifier of the MBS zone in accordance with the position of the terminal 10.

In operation 170, the terminal 10 receives corresponding broadcast data using the identifier of the MBS zone transmitted through the base station 20.

As described above, in the general method of setting the MBS zone, the base station periodically transmits position information of all terminals to the MBS management device. That is, the position information of the terminal which is not positioned in the boundary area of the cell is unnecessarily transmitted to the MBS management device. To prevent the waste of resources due to such unnecessary data transmission, according to the present invention, the base station performs MBS zone setting.

Figure 2:
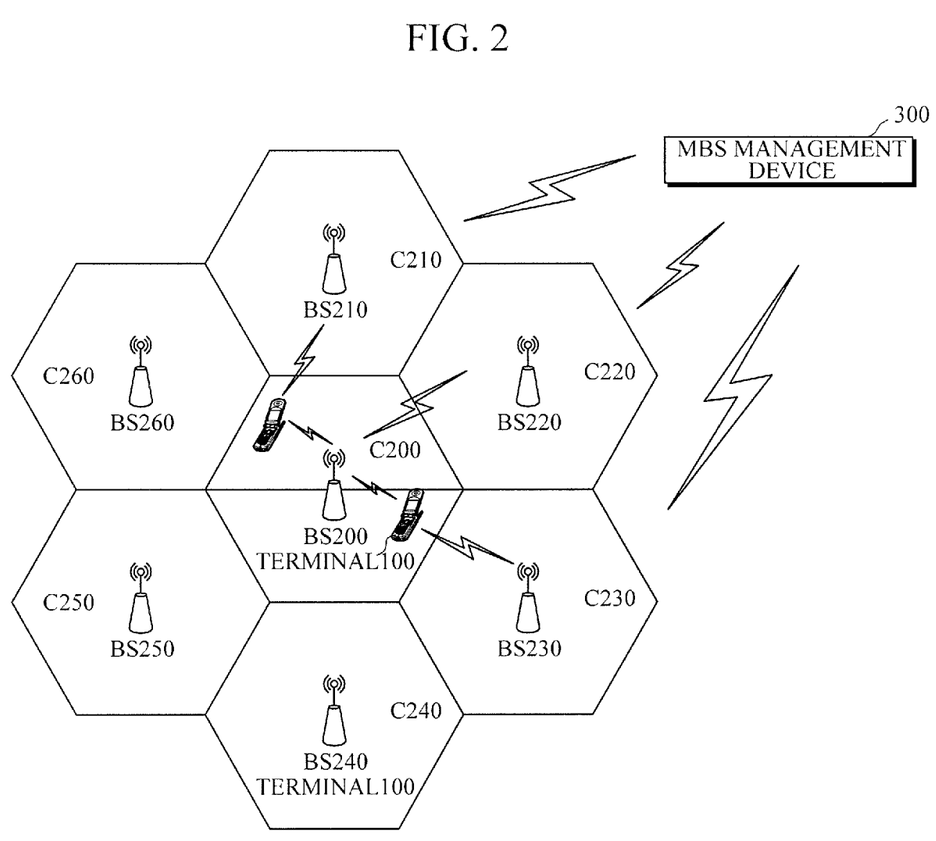
FIG. 2 is a schematic diagram illustrating a system for configuring an MBS zone according to an embodiment of the present invention.

FIG. 2 is a schematic diagram illustrating a system for configuring an MBS zone according to an embodiment of the present invention.

As shown in FIG. 2, the system for configuring the MBS zone according to the present embodiment includes a terminal 100, a plurality of base stations BS 200 to BS 260, and an MBS management device 300.

The system according to the present embodiment configures the MBS zone within a first tier MBS zone, determines a position of a terminal even within the first tier MBS zone, and sets, as the MBS zone, a base station closest to a corresponding terminal only when the terminal is positioned in a boundary area of a cell.

The terminal 100 receives MBS by performing communication with the base station. In this instance, for convenience of description, it is assumed that the terminal 100 is positioned in a boundary area between a cell C 200 managed by the base station BS 200 and neighboring cells C 230 and C 240.

Meanwhile, according to the present embodiment, when the base station BS 200 newly sets the MBS zone in accordance with the position of the terminal 100, the terminal 100 receives an identifier of the newly set MBS zone from the MBS management device 300 through the base station BS 200, and receives corresponding broadcast data using the received identifier of the MBS zone.

The base stations BS 200 to BS 260 provide the MBS to the terminal 100 through communication with the terminal 100 and the MBS management device 300.

In addition, according to the present embodiment, the base stations BS 200 to BS 260 determine position information of the terminal to set an MBS zone. In this instance, the base stations BS 200 to BS 260 decide the MBS zone based on quality information (a Carrier to Interference and noise Ratio; CINR) of signals received from the base stations by the terminal as well as the position information of the terminal. This will be described in detail with reference to FIG. 3.

The MBS management device 300 is a device for managing MBS provision services, and provides the MBS in accordance with MBS zone setting information received from the base station without setting the MBS zone according to the present invention. This will be described in detail with reference to FIG. 4.

Figure 3:
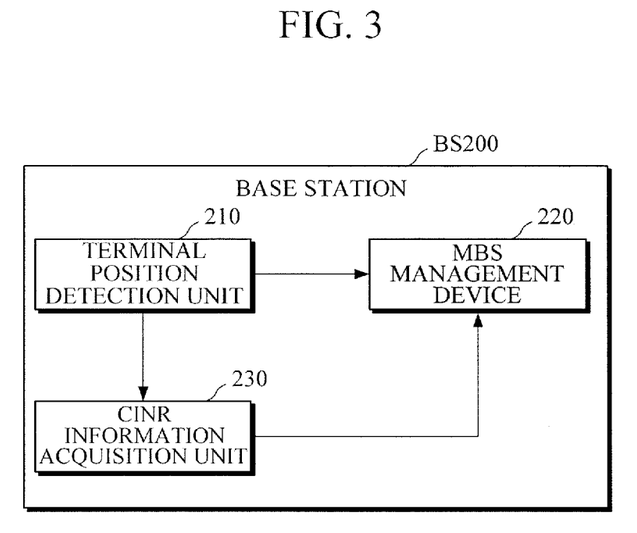
FIG. 3 is an inner configuration diagram illustrating a base station according to a preferred embodiment of the present invention.

FIG. 3 is an inner configuration diagram illustrating a base station according to a preferred embodiment of the present invention.

Referring to FIG. 3, a base station BS 200 includes a terminal position detection unit 210 and an MBS zone setting unit 220. The base station BS 200 further includes a CINR information acquisition unit 230.

The terminal position detection unit 210 periodically detects a position of a terminal in a coverage range of the base station BS 200.

The terminal position detection unit 210 determines whether the terminal is positioned in a boundary area of a cell. Here, the position of the terminal refers to a distance of separation from a center base station. For this, the terminal position detection unit 210 includes a time offset value in a response (RNG-RSP) message for a periodic ranging request (RNG-REQ) from the terminal 100 to thereby transmit the time offset value to the terminal 100. Here, the time offset value is used to calculate the position of the terminal by the base station 200.

The terminal position detection unit 210 calculates the position of the terminal by substituting the time offset value into the following Equation 1.

$$d_{MS} = \frac{\text{time offset}}{F_s} * c [\text{meter}]. \quad [\text{Equation 1}]$$

Here, c denotes the speed of light ($3 \times 10^8$ [m/sec]), and Fs denotes a sampling frequency.

When a corresponding terminal is separated from the center base station by a predetermined distance based on the result of calculating the position of the terminal, the terminal position detection unit 210 determines that the terminal is positioned in the boundary area of the cell. Here, according to the present embodiment, the predetermined distance may be at a range of 750 m to 1,000 m.

The MBS zone setting unit 220 receives position information of the terminal from the terminal position detection unit 210, and sets the MBS zone of the terminal positioned in the boundary area of the cell based on the position information.

The MBS zone setting unit 220 classifies the set MBS zone using an identifier, and transmits the classified MBS zone to the MBS management device 300.

Meanwhile, when the terminal is not positioned in the boundary area of the cell, the MBS zone setting unit 220 maintains the currently set MBS zone as is.

However, according to the present embodiment, in order to configure an optimized MBS zone, the base station 200 may further include the CINR information acquisition unit 230.

The CINR information acquisition unit 230 acquires, from a corresponding terminal, a CINR of a serving base station and neighboring base stations of the terminal positioned in the boundary area of the cell which is detected by the terminal position detection unit 210, and outputs the acquired CINR to the MBS zone setting unit 220.

Next, the MBS zone setting unit 220 verifies the CINR of the serving base station, and determines MBS zone configuration in accordance with the CINR. Specifically, the MBS zone setting unit 220 determines that interference from neighboring base stations is absent when the CINR of the serving base station is larger than 3 dB, and determines that interference from neighboring base stations is present when the CINR is equal to or less than 3 dB.

When interference is absent, the MBS zone setting unit 220 verifies the CINR of the neighboring base stations received from the terminals 100, and configures the MBS zone using a total of three base stations including two neighboring base stations and the serving base station in order of descending CINR.

Figure 4:
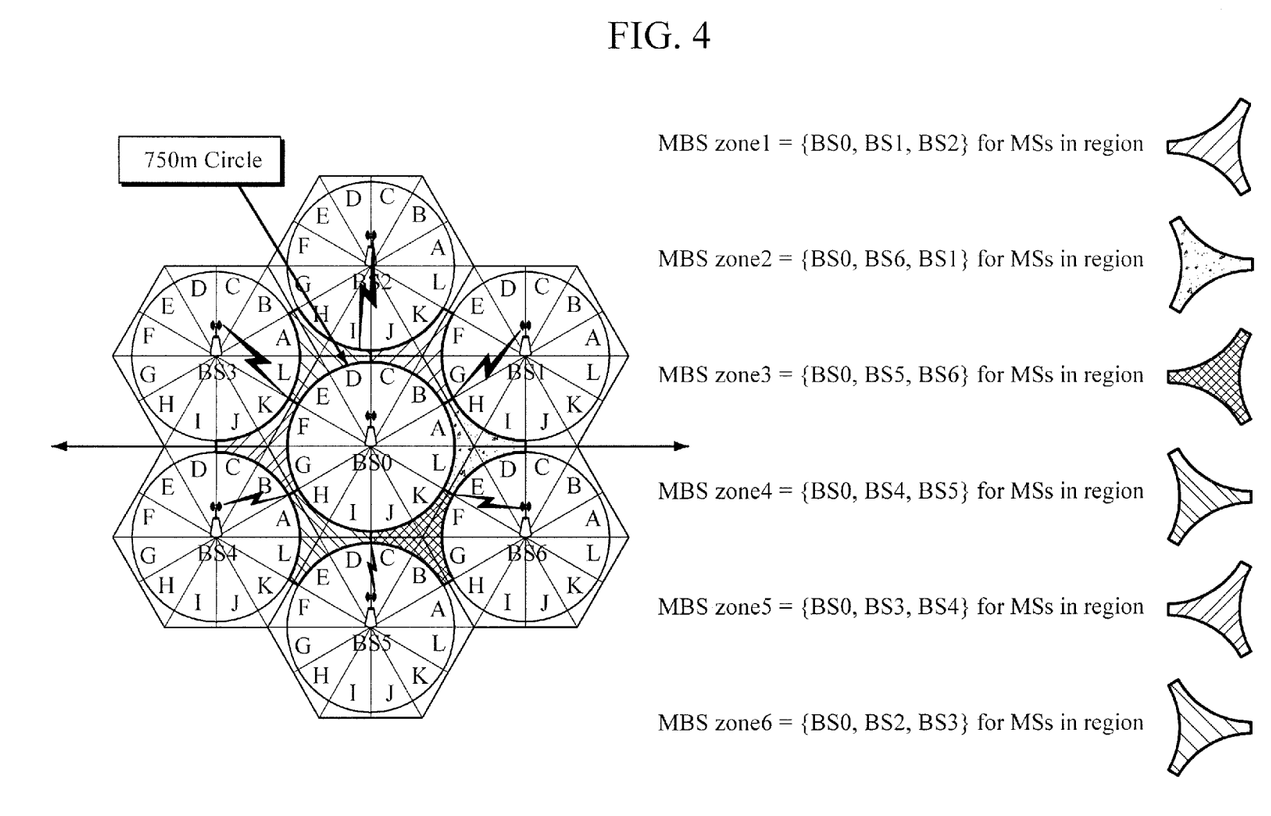
FIG. 4 is a diagram illustrating an example of configuring an MBS zone when interference is absent.

FIG. 4 is a diagram illustrating an example of configuring an MBS zone when interference is absent.

Referring to FIG. 4, an example in which the MBS zone is configured by three base stations is illustrated.

When interference is present, the MBS zone setting unit 200 verifies the CINR of the neighboring base stations received from the terminals 100, and configures the MBS zone using a total of four base stations including three neighboring base stations and the serving base station in order of descending CINR.

Figure 5:
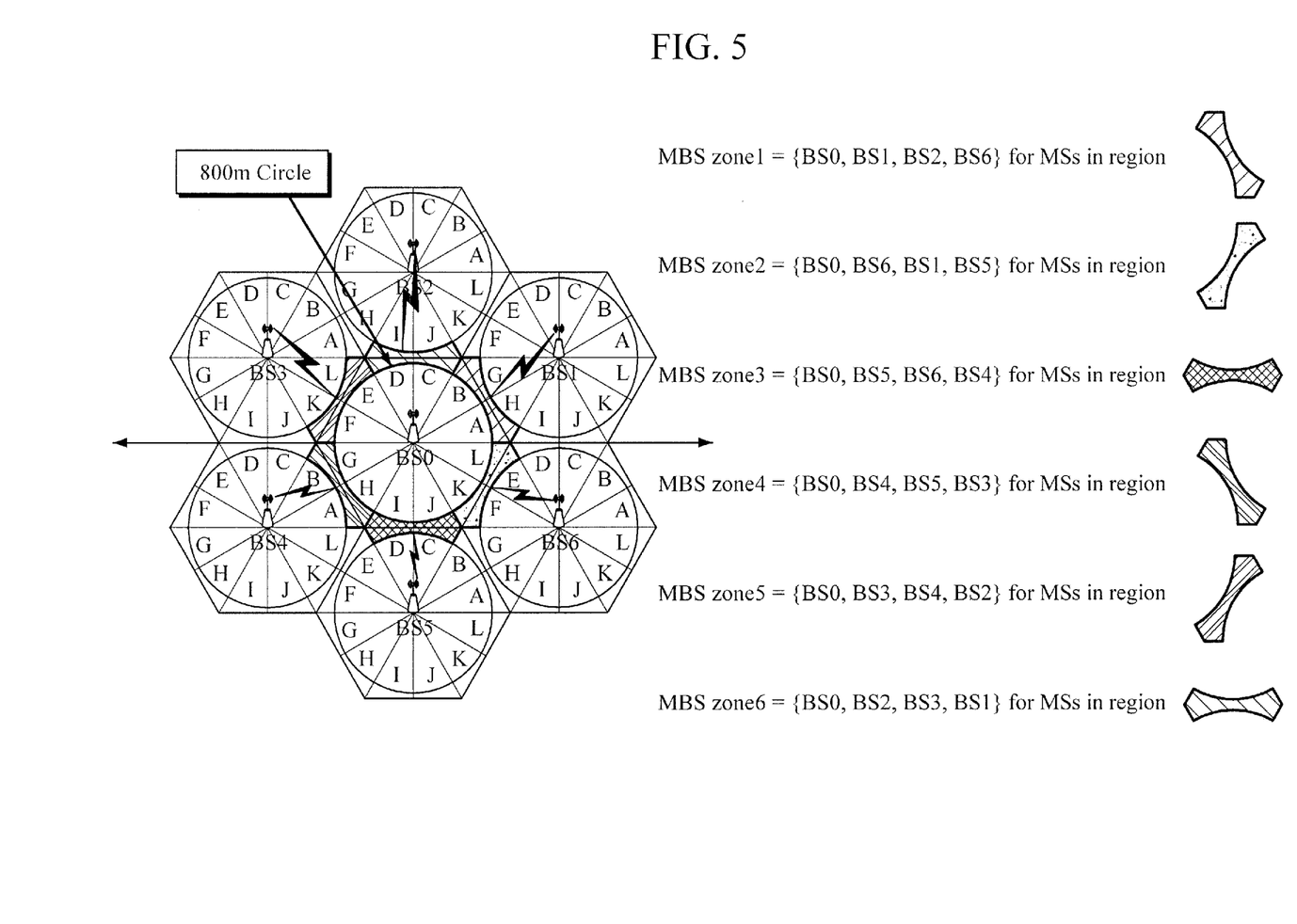
FIG. 5 is a diagram illustrating an example of configuring an MBS zone when interference is present.

FIG. 5 is a diagram illustrating an example of configuring an MBS zone when interference is present.

Referring to FIG. 5, an example in which the MBS zone is configured by four base stations is illustrated.

The MBS zone setting unit 220 transmits MBS zone configuration result information to the MBS management device 300, and requests allocation of the MBS zone from a corresponding terminal.

The MBS zone configuration result information may include an ID of the terminal and IDs of base stations to be included in the MBS zone.

Figure 6:
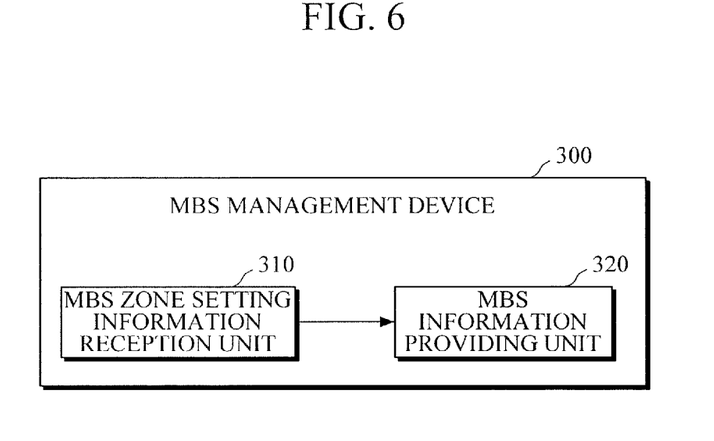
FIG. 6 is a configuration diagram illustrating an MBS management device according to a preferred embodiment of the present invention.

FIG. 6 is a configuration diagram illustrating an MBS management device according to a preferred embodiment of the present invention.

Referring to FIG. 6, the MBS management device 300 includes an MBS zone setting information reception unit 310 and an MBS information providing unit 320.

The MBS zone setting information reception unit 310 receives MBS zone setting information from the base station 200.

Next, the MBS information providing unit 320 transmits, to a corresponding terminal 100 through the base station BS 200, an identifier of the MBS zone set in accordance with a position of the terminal received from the MBS zone setting information reception unit 310.

Figure 7:
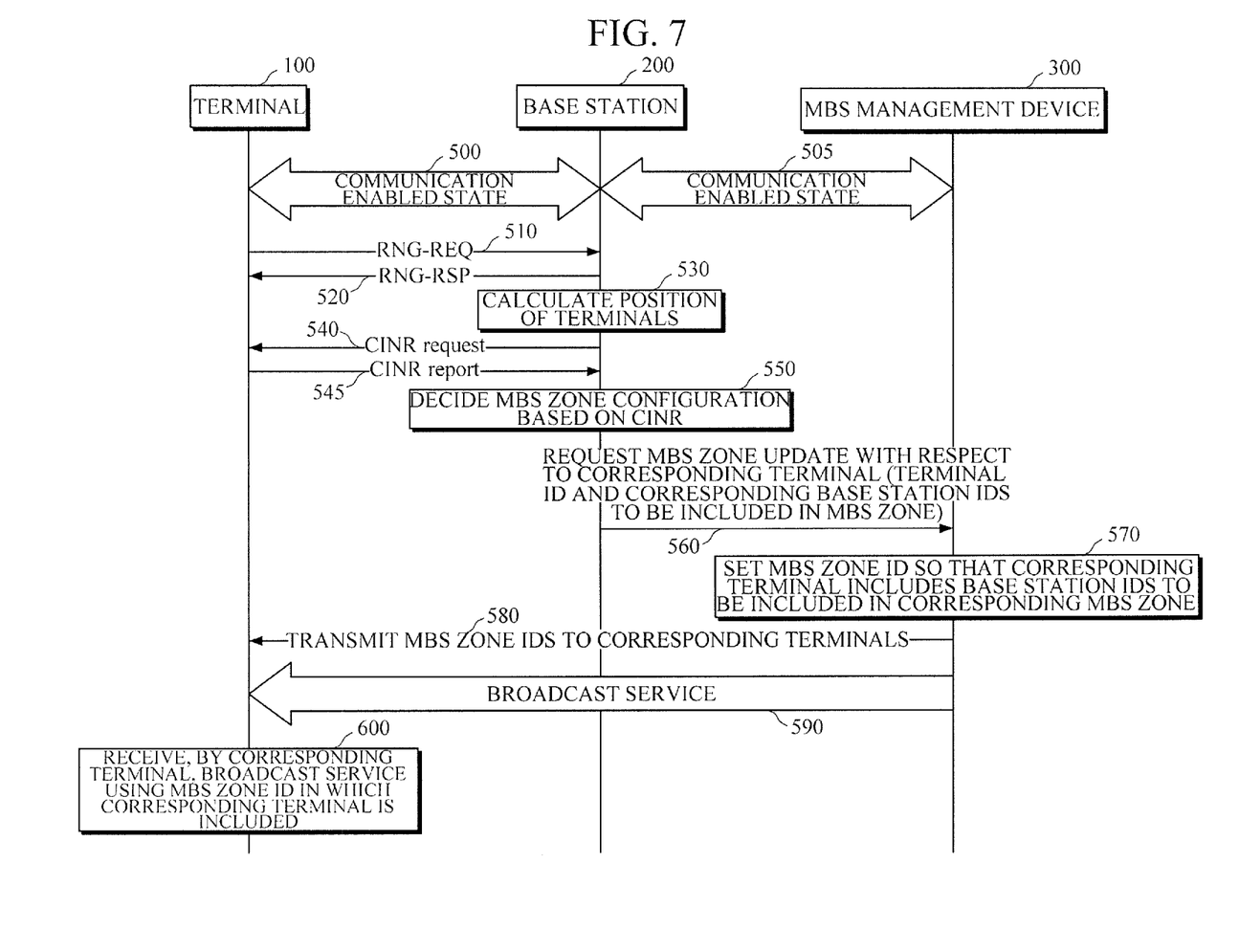
FIG. 7 is a flowchart illustrating a method for setting an MBS zone according to a preferred embodiment of the present invention.

FIG. 7 is a flowchart illustrating a method for setting an MBS zone according to a preferred embodiment of the present invention.

Referring to FIG. 7, in operation 500, the terminal 100 according to the present embodiment establishes a basic communication channel with the base station 200 for setting an MBS zone.

In operation 505, the base station BS establishes a basic communication channel with the MBS management device 300 for setting the MBS zone.

First, in operation 510, the terminal 100 requests (RNG-REQ), from the base station 20, a required update on a state of a moving terminal 10 through periodic ranging.

Next, in operation 520, the base station 200 responds (RNG-RSP) to the request (RNG-REQ) of the terminal 100.

In this instance, the base station 200 includes a time offset value in a response (RNG-RSP) message and transmits the time offset value to the terminal 100. Here, the time offset value is used to calculate a position of a terminal by the base station 200.

In operation 530, the base station 200 determines whether the terminal is positioned in a boundary area of a cell by calculating positions of terminals. Here, the position of the terminal refers to a distance separated from a center base station.

As described above, the base station 200 calculates the position of the terminal by substituting the time offset value into Equation 1 above.

When a corresponding terminal is separated from the center base station by a predetermined distance based on the result of calculating the position of the terminal, the base station 200 determines that the terminal is positioned in the boundary area of the cell. Here, according to the present embodiment, the predetermined distance may be at a range of 750 m to 1,000 m.

The base station 200 configures the MBS zone of the terminal positioned in the boundary area of the cell.

However, in operation 540, according to the present embodiment, in order to configure an optimized MBS zone, the base station 200 requests (CINR request), from the corresponding terminal, a CINR of a serving base station and neighboring base stations of the corresponding terminal.

In operation 545, the corresponding terminal 100 reports, to the base station 200, the CINR of the serving base station and the neighboring base stations as the response (CINR report).

Next, in operation 550, the base station 200 verifies the CINR of the serving base station reported by the terminals 100, and decides the MBS zone configuration in accordance with the CINR.

Specifically, the base station 200 determines that interference from neighboring base station is absent when the CINR of the serving base station is larger than 3 dB, and determines that interference is present when the CINR is equal to or less than 3 dB.

When interference is absent, the base station 200 verifies the CINR of the neighboring base stations reported by the terminals 100, and configures an MBS zone using a total of three base stations including two neighboring base stations and the serving base station in order of descending CINR.

As described above, referring to FIG. 4, the example in which the MBS zone is configured by three base stations is illustrated.

When interference is present, the base station 200 verifies the CINR of the neighboring base stations reported by the terminals 100, and configures an MBS zone using a total of four base stations including three neighboring base stations and the serving base station in order of descending CINR.

As described above, referring to FIG. 5, the example in which the MBS zone is configured by four base stations is illustrated.

In operation 560, the base station 200 transmits MBS zone configuration result information to the MBS management device 300, and requests allocation of the MBS zone from the corresponding terminal.

The MBS zone configuration result information may include an ID of the terminal and IDs of base stations to be included in the MBS zone.

Next, in operation 570, the MBS management device 300 sets corresponding base stations to be included in an MBS zone ID for MBS service with respect to the corresponding terminal.

In operation 580, the MBS zone ID is transmitted to the corresponding terminal 100.

Finally, in operation 590, the corresponding terminal 100 receives broadcast services using the MBS zone ID in which the corresponding terminal 100 is included.

Meanwhile, only when the terminal 10 is positioned in the boundary area of the cell separated from the center of the cell by 750 m to 1,000 m, depending on presence/absence of interference from neighboring cells, macro-diversity gain may be obtained.

In addition, as seen in Table 1, it is optimal that the MBS zone is configured using a total of three base stations including the serving base station when interference is absent, and configured using a total of four base stations including the serving base station when interference is present.

Figure 8:
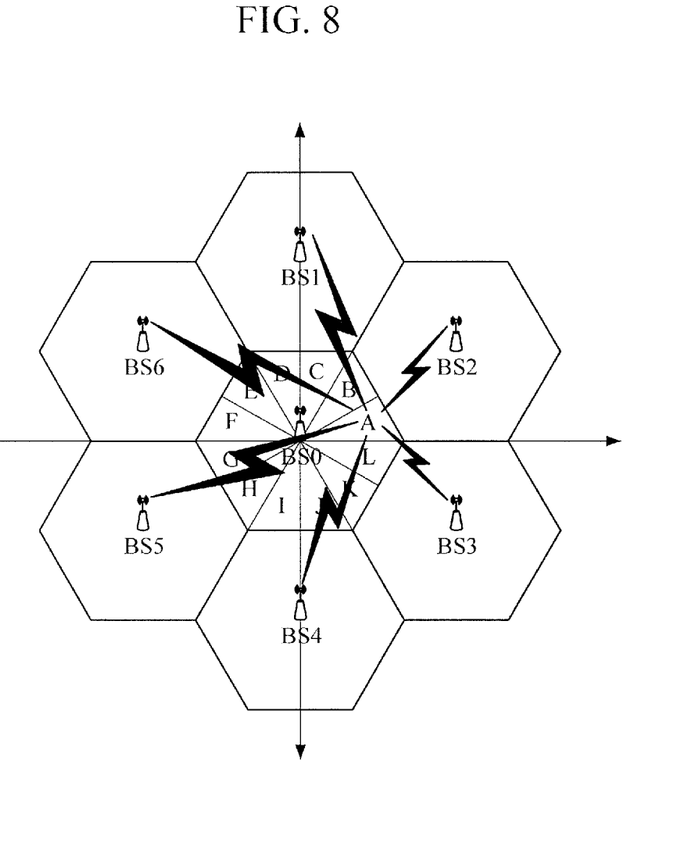
FIG. 8 is a diagram illustrating a case in which an area of a center cell is divided into 12 areas from A to L.
Figure 9:
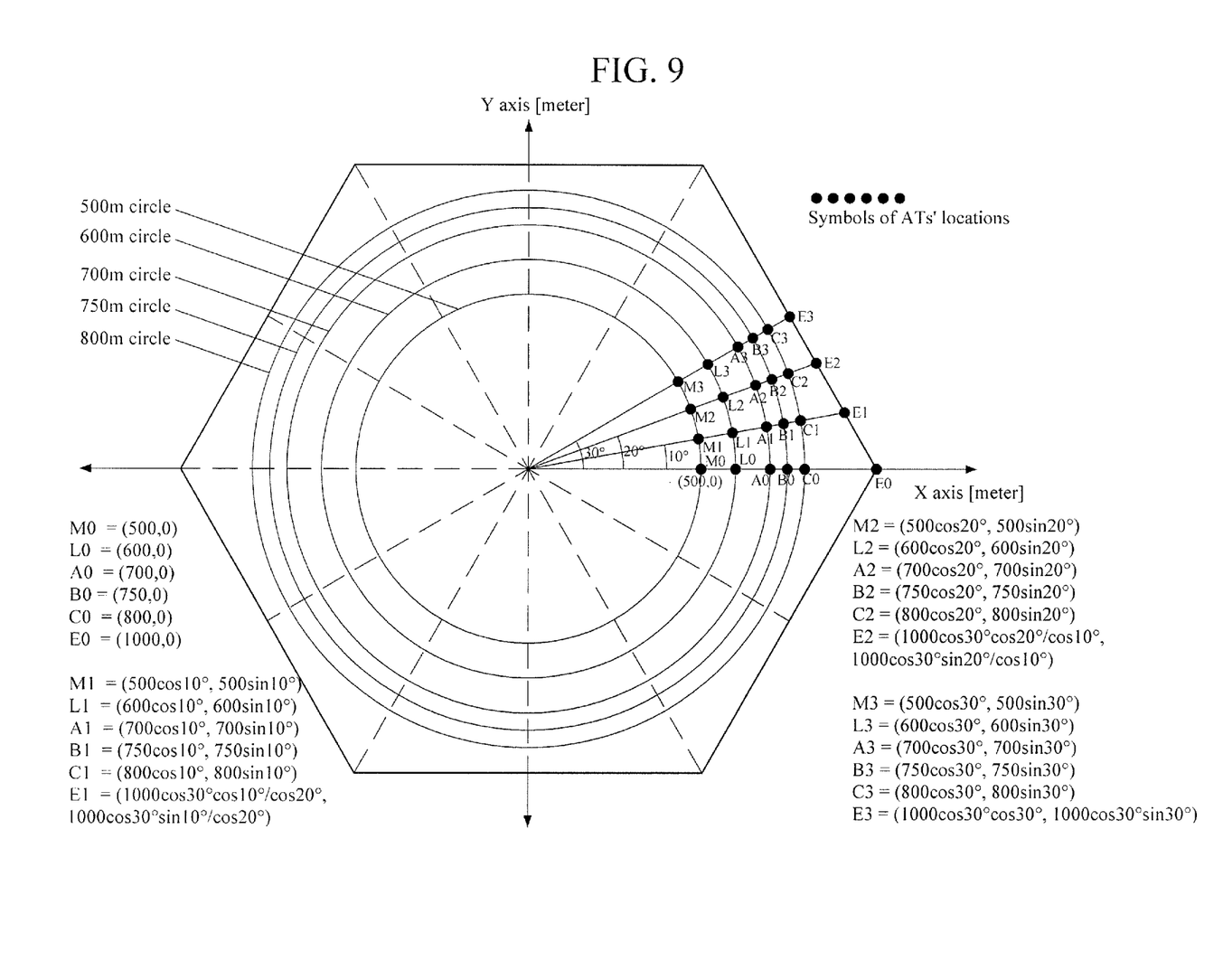
FIG. 9 is a diagram illustrating an example in which positions of terminals separated from a center cell are divided into 24 positions with respect to an area A of FIG. 8.

FIG. 9 is a diagram illustrating an example in which positions of terminals separated from a center cell are divided into 24 positions with respect to an area A of FIG. 8.

Referring to FIG. 9, a simulation is performed on each of 24 positions obtained such that terminals positioned in a boundary area of the cell and separated from the cell center by 500 m, 600 m, 750 m, and 800 m on lines with angles such as 0, 10, 20, and 30 degrees with respect to the center of the cell are selected.

The simulation may be performed by selecting more densely positioned terminals, but since the purpose is to determine by which distance a terminal separated from the cell center has diversity effects based on the performance analysis results, intervals of 50 m, 10 m, and the like may be used.

As described above, according to the embodiments of the present invention, the MBS zone with respect to a corresponding terminal is determined in the base station not the MBS management device, so that the base station periodically transmits positions of all terminals currently poisoned in a corresponding cell to the MBS management device, thereby preventing unnecessary data transmission.

In addition, based on position information of a corresponding terminal and a case when interference signals from a neighboring cell are present, an optimized MBS zone may be configured.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

TABLE 1

| classification | When interference between cells is absent | | When interference between cells is present | |
| --- | --- | --- | --- | --- |
| | A point where macro-diversity gain starts to occur (a distance separated from the center of the cell) [unit: meter] | The minimum number of base stations constituting the MBS zone having the highest macro-diversity gain [unit: the number of base stations] | A point where macro-diversity gain starts to occur (a distance separated from the center of the cell) [unit: meter] | The minimum number of base stations constituting the MBS zone having the highest macro-diversity gain [unit: the number of base stations] |
| 0 degree | 720 | 3 | 770 | 4 |
| 10 degrees | 750 | 3 | 800 | 4 |
| 20 degrees | 700 | 2 | 750 | 4 |
| 30 degrees | 700 | 2 | 750 | 4 |

In order to examine diversity performance in accordance with positions of the terminals positioned within the center cell and a set of base stations constituting the MBS zone in an SFN environment within the first tier MBS zone as shown in FIG. 5, there are a great many cases of environments for obtaining the results of Table 1 when performing simulation on cases in which the terminals are positioned in all points of the center cell.

FIG. 8 is a diagram illustrating a case in which an area of a center cell is divided into 12 areas from A to L.

As shown in FIG. 8, since strengths and delay times of signals received from neighboring base stations are all symmetric in each of the areas, performance in accordance with positions of terminals in an area A among the 12 areas is examined in a simulation, so that the examination results may be applied to the other areas.

What is claimed is:

1. A method for configuring a multicast/broadcast service (hereinafter, referred to as "MBS") zone of a terminal in a base station, comprising:

determining whether terminals connected for communication are positioned in a boundary area of a cell by calculating positions of the terminals; and deciding, by the base station, an MBS zone of the terminals positioned in the boundary area of the cell, wherein the determining includes:

including a time offset value in a response message for a periodic ranging request from the terminal connected for communication to thereby transmit the time offset value to the terminal; and calculating the position of the terminal using the transmitted time offset value, wherein the calculating includes calculating the position of the terminal by substituting the time offset value into the following Equation 2:

$$d_{MS} = \frac{\text{time\_offset}}{F_t} * c[\text{meter}],\qquad [\text{Equation 2}]$$

where c denotes the speed of light ($3\times10^8$[m/sec]), and Fs denotes a sampling frequency.

2. A method for configuring a multicast/broadcast service (hereinafter, referred to as "MBS") zone of terminals in a base station, comprising:
- determining whether the terminals connected for communication are positioned in a boundary area of a cell by calculating positions of the terminals;
- deciding, by the base station, the MBS zone of the terminals positioned in the boundary area of the cell; and
- determining whether interference is present in signals received by the terminals positioned in the boundary area of the cell,
- wherein the deciding decides the MBS zone of the terminals in accordance with presence/absence of the interference,
- wherein, when interference is absent, the deciding configures the MBS zone using a total of four base stations including three neighboring base stations and a serving base station in order of descending CINR by verifying the CINR of the neighboring base stations received from the terminals.

3. The method for configuring an MBS zone according to claim 2, wherein the determining includes determining that the terminal is positioned in the boundary area of the cell when the terminal is positioned at a range of 750 m to 1,000 m from a center base station.

4. The method for configuring an MBS zone according to claim 2, wherein the determining whether interference is present includes:
- requesting, from a corresponding terminal, a Carrier to Interference and Noise Ratio (CINR) of a serving base station and neighboring base stations;
- receiving the CINR of the serving base station and the neighboring base stations as a CINR report from the corresponding terminal; and
- determining that interference from neighboring base station is present when the CINR is equal to or less than a predetermined threshold value.

5. The method for configuring an MBS zone according to claim 4, wherein the threshold value is 3 dB.

6. The method for configuring an MBS zone according to claim 2, wherein, when interference is present, the deciding includes configuring the MBS zone using a total of three base stations including two neighboring base stations and the serving base station in order of descending CINR by verifying the CINR of the neighboring base stations received from the terminals.

7. The method for configuring an MBS zone according to claim 2, further comprising:
- transmitting MBS zone configuration result information to an MBS management device, and requesting allocation of the MBS zone from a corresponding terminal.

8. A method for configuring a multicast/broadcast service (hereinafter, referred to as "MBS") zone of terminals in a base station, comprising:
- determining whether the terminals connected for communication are positioned in a boundary area of a cell by calculating positions of the terminals;
- deciding the MBS zone of the terminals positioned in the boundary area of the cell, and
- determining whether interference is present in signals received by the terminals positioned in the boundary area of the cell,
- wherein the deciding decides the MBS zone of the terminals in accordance with presence/absence of the interference,
- wherein, when interference is absent, the deciding configures the MBS zone using a total of four base stations including three neighboring base stations and a serving base station in order of descending CINR by verifying the CINR of the neighboring base stations received from the terminals.

* * * * *